Oct. 1, 1940.  J. HAGEN  2,216,341
FISH CASTING ROD
Filed Sept. 1, 1937
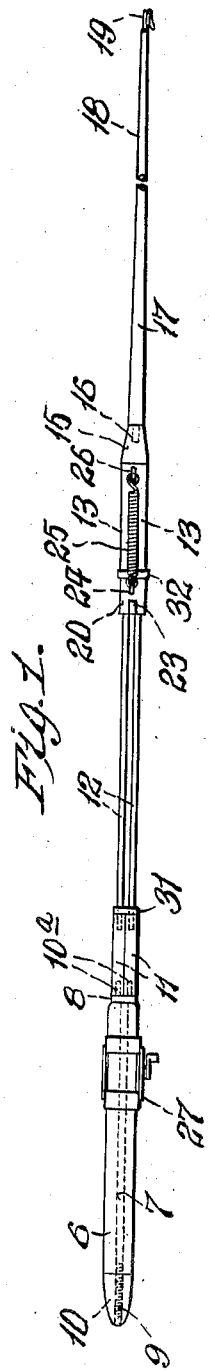
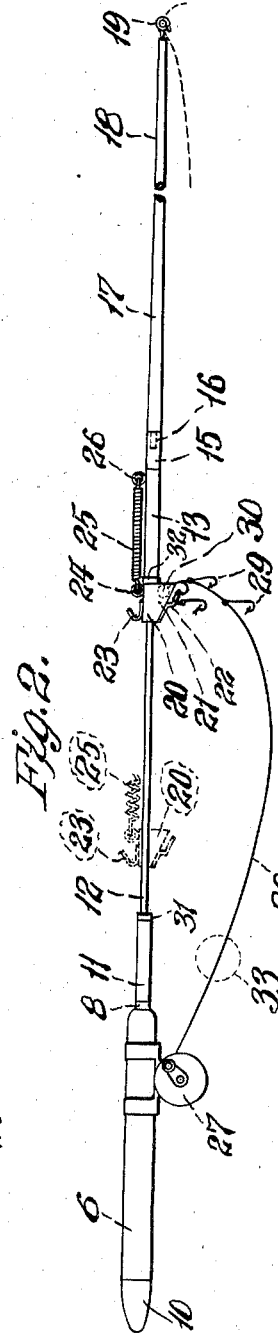
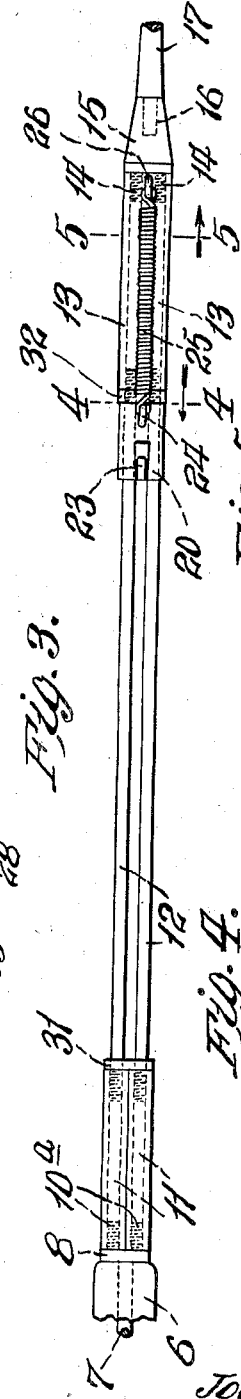
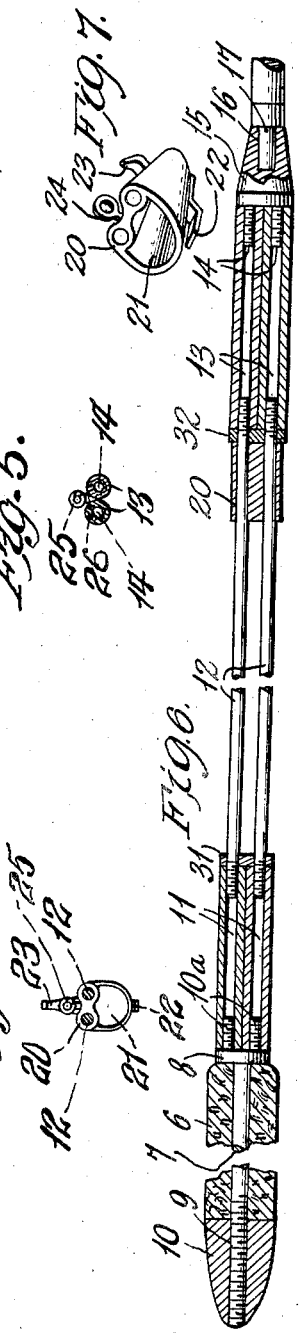
Inventor:
John Hagen.
By Herbert G. Fletcher
Atty.

Patented Oct. 1, 1940

2,216,341

UNITED STATES PATENT OFFICE 2,216,341

FISH CASTING ROD

John Hagen, St. Louis, Mo.

Application September 1, 1937, Serial No. 161,908

3 Claims. (Cl. 43—19)

This invention relates to a fish casting rod for anglers and has for its primary purpose, the provision of means carried by the rod for eliminating the heretofore swinging casting effort of the angler, required for casting the baited end of the fishing line in a desired spot or place in a river or lake.

The invention has for one of its objects, to provide the rod with means for propelling the line from the rod.

Another object is to provide a casting rod with an elastically actuated slidable element for discharging the baited end of the fishing line from the rod.

A further object is to provide the casting rod with guiding means for a slidable element to which the baited end of a fishing line is detachably secured, and the slidable element having resilient means for actuating it in one direction for discharging the baited end of the fish line therefrom, in a selected direction.

A still further object is in providing a casting rod of an improved arrangement of parts.

Other objects and advantages will appear as this description progresses and by reference to the drawing, in which—

Figure 1 is a top elevation of this improved fish casting rod.

Figure 2 is a side elevation of Fig. 1.

Figure 3 is an enlarged fragmentary top elevation of an intermediate portion of the casting rod.

Figure 4 is an enlarged transverse section taken approximately on the line 4—4 of Fig. 3.

Figure 5 is an enlarged transverse section taken approximately on the line 5—5 of Fig. 3.

Fig. 6 is an enlarged fragmentary elevation similar to Fig. 3 but being partly shown in section.

Fig. 7 is an enlarged perspective view of the slide block and its bait-holding cup.

Referring to the several figures of the drawing, the casting rod shown comprises a hand-gripping portion 6 through which a rod 7 of a fitting 8 is longitudinally extended, the rod on its extending end being threaded as designated at 9, and is secured in position by the butt end nut 10 which is engaged on the threads 9 (Fig. 1).

The fitting 8 is provided with a pair of parallelly extending threaded studs 10a to which tubes 11 are threadingly engaged, and in threaded engagement with the opposite ends of said tubes are respective guide rods 12, said guide rods at their opposite ends, threadingly engaging respective tubes 13 and said tubes 13 at their opposite ends being threadingly secured to respective studs 14 of a fitting 15.

The fitting 15 is provided with a socket 16 for engaging and holding one end of a lengthening leg 17 and to which other lengthening legs of the fishing rod may be similarly attached, the end or last lengthening leg 18 having an open loop line securing ring 19 on its extending end.

Mounted on the guide rods 12 is a slide block 20 having a longitudinally disposed cup 21 on its underside, and beneath the cup and secured thereto, is a hook 22. The open end of the cup 21 and the hook 22 is directed away from the hand-gripping end 6, and the slide block 20 on its upper side is provided with a finger engaging portion 23 and an eye 24 which are securely fixed to the slide block, and connected to the eye 24 is one end of a coil spring 25 and said spring at its opposite end being connected to an eye 26 which is securely fixed to and between the outer extending ends of the tubes 13.

Securely fixed to and carried by the hand-gripping portion 6, is a reel 27 to which one end of a fish line 28 is secured, and wound and secured to the baiting end of the line are the usual fish hooks 29 and line sinker 30. Mounted on the rods 12 against the outer extending ends of the sleeves 11, is a cushioning pad 31 and on said rods adjacent their other ends and in abutment with the inner extending ends of the tubes 13, a cushioning pad 32 is also mounted, said pads 31 and 32 being made of a resilient material such as rubber.

In use, this improved casting rod after the fish hooks 29 have been baited, is held in an upwardly inclined position so that the baited end of the line 28 may be hung and held on the hook 22 and the sinker 30 deposited in the cup 21 of the slidable block 20, and the casting rod is then ready for casting performance, providing it is seen that the line 28 can be freely unwound from the reel 27 when casting is effected. In some instances the baited end of the line may be deposited and held in the cup 21.

The angler while holding the casting rod in an upwardly inclining position, at the same time will direct or aim the rod in an intended direction, and while one hand of the angler securely grips the portion 6, the other hand is used to grasp and pull the finger engaging portion 23 of the slidable block 20 and the same is pulled towards the hand-gripping portion 6 to an approximate position shown in dotted lines in Fig. 2, this retracted position of the slidable block 20, tensioning the coil spring 25 so that upon release of the finger engaging portion 23, the slidable block 20 will be quickly projected forwardly on the guide rods 12 to the end of the "run" provided thereby, with a consequent sudden impact against the cushioning pad 32 and from which complete discharge of the baited end of the line 28 will be made, as the baited end of the line is propelled from the cup 21 or hook 22 of the slidable block 20.

After a casting has been made, the line 28 is quickly positioned for being wound up by the reel 27 by inserting the line in the open loop securing ring 19 so that the rod may properly support the line in the winding in operation, in the event a catch has been made.

If it is desired to float the line in a projected place, a float 33 may be attached to the line.

From the foregoing, it is apparent that applicant has produced a device in combination with a casting rod for propelling the alluring end of a fish line from the rod in a manner different than heretofore, and which form or manner of operation of the device permits the line to be cast from more advantageous locations where tree hazards or the like are present, and in such locations where the present manner of casting by throwing or whipping of the rod cannot be accomplished.

Having thus described the invention so that those skilled in the art will be able to practice the same, what I desire to secure by Letters Patent is defined in what is claimed, it being understood that various changes in the device shown and described in detail and not amounting to invention, may be made without departing from the spirit and scope of my invention.

What I claim is:

1. A fishing rod comprising a handle, a rod section projecting from the handle and a second rod section spaced from and in advance of the first rod section, paralleling spaced bars connected to the rod sections and constituting an intermediate rod section in alinement with said first mentioned rod sections, a guide slidably mounted on the bars, said guide including a member of trough shape and a perforated part, the latter constituting a top with the trough shaped member forming a container, a finger piece and an eye piece secured to the top, an eye secured to the second rod section, and spring means connecting the eye and eye piece, said container constituting a bait receptacle for holding bait secured to the rod line, said container being open at its forward end and the bottom thereof inclining upwardly from the forward end to provide a closed rear wall whereby the finger piece may be used by an operator to draw the receptacle rearwardly for holding the set position and to create tension in the spring means so that upon release of the finger piece and the swinging movement of the rod, the receptacle will be moved rapidly in a forward direction and the inclining bottom will aid in causing immediate ejection of the bait from the container.

2. A fishing rod comprising a handle, a rod line section spaced from and in advance of the handle, paralleling spaced bars connected to the handle and the rod line section and constituting a rod section intermediate of and in alinement with the handle and said rod line section, a guide slidably mounted on said bars, said guide including a member of trough shape and forming a receptacle paralleling said bars on the underside thereof, said receptacle being open at its forward end and the bottom thereof inclining upwardly from the forward end to provide a closed rear wall for holding bait secured to the rod line, a finger piece and an eye piece secured to the top of said guide and an eye secured to the rod line section, and spring means connecting the eye and the eye piece whereby the finger piece may be used by an operator to draw the receptacle rearwardly for holding the set position and to create tension in the spring means so that upon release of the finger piece and the swinging movement of the rod, the receptacle will be moved rapidly in a forward direction and the inclining bottom will aid in causing immediate ejection of the bait from the container.

3. A casting rod comprising a handle, an extension rod fitting, a pair of paralleling bars cooperably secured at one end to the handle and at their other ends to said fitting, a detachable rod line section extended from said fitting in alinement with the handle, the fitting and said paralleling bars, a guide slidably mounted on said bars, said guide including an underdisposed part of trough shape and forming a receptacle which is open at its forward end and closed at its rear end and the bottom thereof inclining upwardly from the forward end to the rear end for holding bait secured to the rod line, a finger piece and spring securing means on the top of said guide and an eye secured to the fitting, and a spring connecting said spring securing means and said eye.

JOHN HAGEN.